United States Patent
Feige et al.

(10) Patent No.: US 7,015,167 B2
(45) Date of Patent: Mar. 21, 2006

(54) RAW MATERIAL WITH A HIGH CONTENT OF ALUMINUM OXIDE, AND METHOD OF MANUFACTURING THE RAW MATERIAL

(75) Inventors: Reinhard Feige, Schwelm (DE); Gerhard Merker, Schwerte (DE); Jurgen Steyer, Bochum (DE)

(73) Assignee: Aluminium-Salzschlacke Aufbereitungs GmbH, Hannover (DE)

( * ) Notice: Subject to any disclaimer, the term of this patent is extended or adjusted under 35 U.S.C. 154(b) by 112 days.

(21) Appl. No.: 10/753,966

(22) Filed: Jan. 7, 2004

(65) Prior Publication Data

US 2004/0259718 A1    Dec. 23, 2004

(30) Foreign Application Priority Data

Jan. 8, 2003   (DE) ............................... 103 00 170

(51) Int. Cl.
*C04B 35/10* (2006.01)

(52) U.S. Cl. .................. 501/128; 501/153; 106/404; 106/461

(58) Field of Classification Search ................ 501/128, 501/153, 154, 127; 106/404, 461
See application file for complete search history.

(56) References Cited

U.S. PATENT DOCUMENTS

| | | | |
|---|---|---|---|
| 5,045,506 A | 9/1991 | Dube et al. | |
| 5,424,260 A | 6/1995 | Yerushalmi et al. | |
| 6,132,574 A * | 10/2000 | Feige et al. ............... | 204/279 |
| 6,238,633 B1 | 5/2001 | Pickens et al. | |
| 2002/0124776 A1 * | 9/2002 | Feige et al. ............... | 106/404 |

FOREIGN PATENT DOCUMENTS

| | | |
|---|---|---|
| DE | 43 19 163 A1 | 12/1994 |
| DE | 43 45 368 C2 | 12/1994 |
| EP | 0 838 443 A1 | 4/1998 |
| EP | 0 881 200 A1 | 12/1998 |
| EP | 1 036 044 B1 | 9/2000 |
| EP | 1 180 504 B1 | 2/2002 |

* cited by examiner

*Primary Examiner*—David Sample
(74) *Attorney, Agent, or Firm*—Darby & Darby

(57) ABSTRACT

A raw material with a high content of aluminum oxide has the following composition, in weight-percent, based on dry weight:

| | |
|---|---|
| $Al_2O_3$ | 50–80% |
| MgO | 2–15% |
| SiO2 | 1–15% |
| CaO | 0.5–20% |
| $Fe_2O_3$ | 0.5–2% |
| $Na_2O$ | 0.5–2% |
| Al (metallic) | 0.1–2% |
| AlN | 0.1–1% |
| $K_2O$ | 0.1–1.5% |
| F | 0.1–2% |
| Cl | 0.1–0.8% |
| balance in total, not to exceed | 5% |
| loss on ignition, not to exceed | 15% |

The main mineral constituents of the raw material are, in weight-percent

| | |
|---|---|
| aluminum hydroxide | 20–60% |
| corundum $\alpha$-$Al_2O_3$ | 10–40% |
| spinel $MgAl_2O_4$ | 5–40% |

Specifically, the aluminum hydroxide is present as aluminum mono-hydroxide $Al_2O_3 \cdot H_2O$ and aluminum tri-hydroxide $Al_2O_3 \cdot 3H_2O$ in a weight ratio exceeding 0.25.

10 Claims, No Drawings

RAW MATERIAL WITH A HIGH CONTENT OF ALUMINUM OXIDE, AND METHOD OF MANUFACTURING THE RAW MATERIAL

BACKGROUND OF THE INVENTION

The invention relates to a raw material with a high content of aluminum oxide (also referred to herein as a high-alumina raw material), wherein the aluminum oxide $Al_2O_3$ is present in the mineralogical form of corundum $\alpha$-$Al_2O_3$, spinel $MgAl_2O_4$, aluminum mono-hydroxide $Al_2O3.H_2O$ and aluminum tri-hydroxide $Al_2O_3.3H_2O$, and wherein the weight ratio of aluminum mono-hydroxide to aluminum tri-hydroxide is larger than 0.25. Moreover the invention relates to a process of producing the high-alumina raw material starting from an alumina product extracted from aluminum salt slags, and it also relates to the use of the high-alumina raw material as a sinter-active alumina source for producing ceramic and refractory materials, cement, porosified binding agents used in the construction industry, slag formers for the production of iron and steel, mineral wool and ceramic fibers.

High-alumina raw materials with an $Al_2O_3$ content of 50 to 80 percent are available either as natural raw materials (such as bauxite, sillimanite, kyanite and andalusite) or are synthetically produced by chemical processing of bauxite into pure alumina followed by sintering or melting (as is the case for mullite and spinel). In the interest of conserving natural resources, there is a growing trend towards using secondary raw materials that are recovered from waste materials which occur as by-products of recycling processes.

Aluminum salt slag is generated as a by-product in the recycling of aluminum metal. In this process, the surface of the molten metal is covered with a layer of salt (for example a mixture of 70 percent NaCl, 28 percent KCl and 2 percent $CaF_2$). The purpose of the salt layer is to minimize the oxidation of the metal and to absorb oxidic impurities in the form of a salt slag. The salt slag contains about 40–50 percent salt, 40–50 percent oxides and 10 percent metallic aluminum. As aluminum during melting in air does not only combine with oxygen but also with nitrogen, a salt slag also contains aluminum nitride in addition to aluminum oxide.

In order to recover the components as completely as possible, the salt slag is subjected to a treatment in which most of the metal can be mechanically recovered after crushing the salt slag. Subsequently, the salt slag is treated with water and the salt is dissolved. After separating the insoluble components, herein referred to as "alumina product", the salt is crystallized by evaporating the solution and is thus made available again for the aluminum-melting process described above.

The alumina product contains about 50–80 percent $Al_2O_3$. According to M. Beckmann (Aluminum 67 [1991] 586–593), the $Al_2O_3$ is present in the mineralogical form of corundum $\alpha$-$Al_2O_3$, spinel $MgAl_2O_4$ and aluminum tri-hydroxide $\beta$-$Al_2O_3.3H_2O$ (bayerite). Aluminum tri-hydroxide is formed in the wet treatment of salt slag by the reaction of water with aluminum or aluminum nitride according to the following equations:

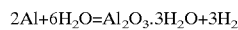

In a practical wet treatment process, the particle size to which the salt slag is crushed and the reaction time are set according to economic criteria with the result that the alumina product can have a residual content of as much as 5 percent aluminum metal and aluminum nitride.

The alumina product is taken out of the wet treatment process as a sludge filtrate in cake form (in most cases with a water content of about 30–45 percent, not in a suitable form for transporting or for measuring out controlled quantities, and with a strong odor of ammonia. The unfavorable consistency and the residual content of aluminum metal and aluminum nitride are a considerable drawback associated with using the alumina product, particularly for producing sintered or fused materials. In the further processing of the alumina product (mixing with other mineral materials, drying, calcining, sintering, melting) the following difficulties occur, some of which represent major problems:

Exposure of workers to malodorous ammonia vapors during handling;

Strong thermal reaction and release of gas (water vapor, $H_2$, $NH_3$) when mixing the product with quicklime and cement, resulting in poor mechanical strength of molded bodies (for example pellets and briquettes);

Corrosion of equipment caused by release of gas;

Risk of explosion caused by release of gas;

Accumulations attaching themselves and forming mechanical obstructions in the machinery and transport paths;

Difficult to control local temperature variations, specifically overheating of rotary kilns used in sintering processes due to uncontrolled thermal reactions of the aluminum metal and the aluminum nitride, resulting in undesirable melting, baked-on material accumulations and formation of lumps.

The reference DE-4319163 discloses a fine-grained filler material for cement-bound solid materials, a residual substance of high-alumina content (i.e., an alumina product) generated in the processing of salt slags in the aluminum industry, which—relative to its dry weight—contains 55–70 percent $Al_2O_3$, 7–10 percent MgO, 6–9 percent $SiO_2$ and a loss on ignition of 7–11 percent. No information is presented on aluminum hydroxide content.

The reference DE-4345368 describes a process for producing sintered spinel containing aluminate cement clinker based on the same residual material as in DE-4319163, at sintering temperatures above 1100° C.

The reference EP-0838443 proposes a process in which aluminum-containing waste materials are used in the production of sintered sulfo-aluminate cement. The process is fed, for example, with a by-product from the treatment of aluminum salt slags, containing 65.7 percent $Al_2O_3$, 10.1 percent MgO, 7.9 percent $SiO_2$ and 7.3 percent $H_2O$, in which the $Al_2O_3$ is present in the crystalline phases of corundum $\alpha$-$Al_2O_3$, bayerite $Al(OH)_3$ and spinel $MgAl_2O_4$. The sintering temperatures are in the range of 1150–1300° C. (examples 1 and 2).

The reference EP-0881200 describes a refractory bottom lining for aluminum electrolytic cells in the form of a monolithic ramming mix of dried and calcined formed bodies (pellets, briquettes, bricks) based on a powder with high-alumina content resulting from the treatment of dross and salt slags in the aluminum industry, containing 40–90 percent $Al_2O_3$, 4–20 percent MgO, 0.5–15 percent $SiO_2$, 0.1–25 percent AlN, 0.1–10 percent Al (metallic) and a maximum of 10 percent loss on ignition. Crystalline phases contained in the powder include corundum $\alpha$-$Al_2O_3$, spinel $MgAl_2O_3$ and fluorspar CaF2. Aluminum hydroxide is not mentioned.

In EP-1036044, a process for producing synthetic glass fibers (rock wool, mineral wool) is disclosed, wherein 2–20 weight-percent of the mineral solids are mineral waste with a content of halogens of at least 1 weight-percent, such as alumina residues from the treatment of aluminum dross and aluminum salt slag, with a content of 0.5–10 weight-percent aluminum metal, 50–90 weight-percent $Al_2O_3$, and up to 5 weight-percent fluorine or other halogens. This reference contains no information on contents of aluminumhydroxide.

EP-1180504 discloses a porosifying, solidification-accelerant additive for binding agents in the form of a high-alumina powder, containing 50–90 percent $Al_2O_3$, up to 10 percent Aluminum (metallic) and main mineral constituents in the form of corundum ($\alpha$-$Al_2O_3$) and spinel ($MgAl_2O_4$), wherein the metallic aluminum particles are enveloped by mineral transition modifications of aluminum tri-hydroxide ($Al_2O_3 \times 3H_2O$) to $\alpha$-alumina. According to the description of the process of producing the powder, a high-alumina waste material from the treatment of aluminum salt slag is shock-dried at flue gas temperatures from 400 to 500° C. and subsequently partially calcined at temperatures up to 1000° C. According to C. Misra (Industrial Alumina Chemicals, American Chemical Society 1986, page 76), no transformation into aluminum mono-hydroxide occurs with a rapid thermal dehydration of aluminum tri-hydroxides, but a direct transformation to the transition modifications $\rho$-$Al_2O_3$, $\eta$-$Al_2O_3$ (above 400° C.) and $\theta$-$Al_2O_3$ (above 750° C.) Corundum $\alpha$-$Al_2O_3$ occurs above 1200° C.

U.S. Pat. No. 5,045,506 describes the use of alumina products from the processing of aluminum dross and salt slag in the production of mineral wool, wherein (claim 6) the alumina product from the processing of salt slag must be heated (calcined) to a sufficiently high temperature, that the aluminum hydroxide in the alumina product is transformed to aluminum oxide.

U.S. Pat. No. 5,424,260 describes an alumina product NMP from the processing of aluminum salt slag and its use for the production of ceramic fibers. The alumina product NMP contains 40–75 weight-percent $Al_2O_3$, 5–20 weight-percent MgO, 2–15 weight-percent $SiO_2$, with a loss on ignition of about 20 weight-percent (column 5, lines 57–68). There is no information on aluminum hydroxide content.

U.S. Pat. No. 6,238,633 discloses a process for producing a sintered calcium aluminate slag former for use in the production of steel, based on a non-metallic product NMP (column 5, lines 44 ff.), consisting of 40–75 weight-percent $Al_2O_3$, 0–20 weight-percent MgO, 2–15 weight-percent $SiO_2$, in each case less than 1 percent aluminum metal and aluminum nitride, and a loss on ignition at 1400° C. of 5–35 weight-percent. No information on the contents of aluminum hydroxides is given other than a reference to an "amorphous alumina precursor phase" or "hydrated amorphous phase" that is transformed into corundum during calcining (column 6, line 39–48). After mixing with CaO or CaO-carriers (calcium hydroxide or calcium carbonate), pellets or extruded shapes are formed and heated to a temperature between 1093 and 1193° C. A calcium aluminate produced in this manner has a melting point of 1360° C. (column 12, line 6–8). The NMP is produced from aluminum salt slag, wherein a reduction of the contents of aluminum metal and aluminum nitride by a fine sieve separation helps to prevent materials from sticking to surfaces of agglomerating into lumps during the sintering of the calcium aluminate (column 11, line 46–49). The disadvantage of this process is, that the mechanically separated aluminum metal and aluminum nitride are no longer available for the formation of aluminum oxide. Thus, the $Al_2O_3$ content of the alumina source is reduced, a higher total quantity of the alumina source is needed in the mixture, and the impurities in the NMP lead to a loss of purity and degradation of quality in the calcium aluminate.

SUMMARY OF THE INVENTION

The present invention therefore has the objective to produce a high-alumina raw material from the alumina-containing by-product which occurs in the recycling of salt slag in the aluminum industry and which is of limited immediate utility because of its high residual content of metallic aluminum, aluminum nitride, ammonia, and moisture. The invention aims to provide a high-alumina raw material which, in comparison to the aforementioned by-product, is better suited for the manufacture of products made by sintering or fusing. Such products include ceramic and refractory materials, cement, calcium aluminate slag formers for the production of iron and steel, as well as mineral wool and ceramic fibers. The high-alumina raw material should in particular have better sintering properties. In addition, a fast-setting construction material of high porosity should be producible without requiring a partial calcination of the alumina product in the temperature range of 400–1000° C. (which is a requirement in EP-1180504).

DETAILED DESCRIPTION

In accordance with the invention, an alumina product which results as a by-product from the processing of aluminum salt slags and which contains aluminum tri-hydroxide, aluminum metal and aluminum nitride, is mechanically compacted to a sufficient degree to favor the exothermic reaction of residual aluminum metal and aluminum nitride with the water that is contained in the form of moisture in the alumina product, so that aluminum hydroxide is formed in the reaction and suitable hydro-thermal conditions are created by the reaction heat to allow the aluminum tri-hydroxide (bayerite) to transform itself into aluminum mono-hydroxide (boehmite) which has a smaller amount of crystal-bound water. Thus, with a moisture-containing alumina product as a starting material, residual aluminum metal and aluminum nitride can be transformed into aluminum hydroxide without lowering the total $Al_2O_3$ content (in contrast to the solution offered in U.S. Pat. No. 6,238,633). As a side benefit, the process of the present invention reduces the ammonia odor that is caused by the evaporation of the ammonia-containing moisture in the aforementioned prior-art process.

In sintering or fusion processes, the aluminum mono-hydroxide boehmite in comparison to the aluminum tri-hydroxide bayerite has the advantages of a lower content of crystal-bound water, a wider range of temperature for the release of the crystal-bound water, and a higher crystal density. In order to obtain the full benefit of the boehmite content, the aluminum mono-hydrate should make up at least 20 percent of the aluminum hydroxide phases, i.e., the ratio of boehmite to bayerite should be greater than 20:80=0.25. The ratio of the phases is determined by x-ray diffraction and comparison of the peak intensities of boehmite (d=6.11 Å) and bayerite (d=4.72 Å). If boehmite is in very fine-crystalline or colloidal form, a broadening of the peaks is detectable in the range of d=6.11 Å.

The following table allows a comparison between the properties of both aluminum hydroxide phases:

|  | Al-tri-hydroxide | Al-mono-hydroxide |
|---|---|---|
| Formula | $Al_2O_3 \cdot 3H_2O$ or $Al(OH)_3$ | $Al_2O_3 \cdot H_2O$ or $AlOOH$ |
| Mineral phase | bayerite | boehmite |
| $Al_2O_3$ content | 65.4% | 85.0% |
| Loss on ignition (crystal-bound water) | 34.6% | 15.0% |
| Release of crystal-bound water | 200–400° C. | 400–700° C. |
| Theoretical density | 2.53 g/cm³ | 3.01 g/cm³ |
| Bulk density (without crystal-bound water) | 1.65 g/cm³ | 2.56 g/cm³ |

According to C. Misra (Industrial Alumina Chemicals, American Chemical Society 1986, page 17), the hydrothermal transformation from aluminum tri-hydroxide into boehmite requires a temperature above 150° C. To provide the hydrothermal conditions, a closed heated pressure container (autoclave) is normally required.

The high-alumina raw material can be obtained by drying the alumina product to a residual moisture content of less than 5 percent, then compacting and grinding it in a vibratory grinder. A powder formed by this process is particularly suitable for producing porosified binding agents used in the construction trade (for example mineral foam based on alkaline water glass).

The high-alumina raw material can further be produced by compacting the alumina product in a mixture with other suitable mineral materials with a preferably similar particle size, where at least 90 weight-percent of the material have a particle size smaller than 500 μm. These mineral materials include for example burnt lime, calcium hydroxide, cement (portland cement, aluminate cement), pulverized lime stone, iron oxide carriers and silicon oxide carriers (clay, sand, burnt iron sulfide, haematite, red mud, fly ash). Mixtures formed in this manner can be used for producing ceramic and refractory materials, cement, porosified binding agents used in construction, slag formers for iron and steel, mineral wool and ceramic fibers.

COMPARATIVE EXAMPLE 1

The alumina product used in the following examples had a muddy consistency, a noticeable odor of ammonia, a moisture content of 35 weight-percent, and a particle size smaller than 0.5 mm in at least 90 weight-percent of the product. Its chemical composition (in weight-percent, based on dried material) was:

| | |
|---|---|
| $Al_2O_3$ | 61 |
| Al-metal | 2.4 |
| AlN | 1.1 |
| $SiO_2$ | 7.0 |
| MgO | 7.7 |
| CaO | 3.1 |
| $Fe_2O_3$ | 1.4 |
| F | 1.5 |
| Cl | 0.3 |
| Loss on ignition at 600° C. | 11.6 |
| Balance in total | 2.9 |

Its main mineral constituents were (in weight-percent):

| | |
|---|---|
| bayerite $Al_2O_3 \cdot 3H_2O$ | 33.5 |
| spinell $MgAl_2O_4$ | 27.5 |
| corundum $\alpha\text{-}Al_2O_3$ | 19.3 |

The contents of the main mineral constituents were calculated from the chemical composition as follows:

bayerite content=(loss on ignition 600° C.)×100/34.6

(crystal-bound water of bayerite: 34.6 percent)

spinel content=(MgO content)×100/28

(MgO content of spinel: 28 percent)

corundum content=($Al_2O_3$+MgO+loss on ignition 600° C.)– bayerite–spinel

The product has a theoretical density of 2.95 g/cm³ and a bulk density of 1.65 g/cm³ (based on dried material: 1.07 g/cm³).

EXAMPLE 2

The alumina product according to example 1 was mixed with 10 weight-percent CaO (burnt lime) in a forced-action mixer and compacted at the same time. Conditions between a moist warm and hydrothermal state were generated in the mixed material, recognizable by the release of water vapor. After about 10 minutes, the temperature in the mixture increased to more than 70° C. After 60 minutes the new high-alumina raw material no longer had a noticeable odor of ammonia, its moisture content was 10 percent, its aluminum metal content was 0.5 percent and its aluminum nitride content was 0.3 percent. The ratio of aluminum monohydroxide to aluminum tri-hydroxide was 0.6, as determined by x-ray diffraction and a comparison of the peak intensities of boehmite (d=6.11 Å) and bayerite (d=4.72 Å).

This example and further investigations lead to the conclusion that the rate at which boehmite is formed can be controlled as a function of the compaction density, the aggregate size, the duration of the treatment, the ambient temperature and the exothermic reactivity of a mixing partner with the hygroscopic water in the alumina product. While, e.g., CaO produces a strong exothermic reaction with calcium hydroxide, the reaction will be weaker if cement (portland cement, aluminate cement) is added. Dry additives, in which the hygroscopic water is only physically bound by wetting of the surface of the particles, for example dry calcium hydroxide, lime stone powder, iron oxide carriers (such as burnt iron sulfide, haematite, red mud) and silicon oxide carriers (such as clay, sand, fly ash) will at least contribute to improving the consistency of the alumina product.

EXAMPLE 3

To produce a sintered calcium aluminate (as slag former for the steel production) with the main components CaO (about 40 weight-percent) and $Al_2O_3$ (about 45 weight-percent), the alumina product according to example 1, or high-alumina raw material according to example 2, was mixed in the appropriate ratio with lime stone powder of the following composition (in weight-percent)

| | |
|---|---|
| CaO | 54.2 |
| $CO_2$ | 43.1 |
| $SiO_2$ | 1.2 |
| $Al_2O_3$ | 0.5 |
| $Fe_2O_3$ | 0.4 |

The mixture was formed into pellets of about 10 mm diameter. The pellets were sintered in an electrically heated laboratory muffel kiln at 900–1300° C. with a holding time of 30 minutes.

Dependent on the sintering temperature, the content of the mineral phase $12CaO.7Al_2O_3$ (determined by X-ray diffraction, in weight-percent) was:

| | Temperature ° C. | | | |
|---|---|---|---|---|
| | 900 | 1000 | 1100 | 1200 |
| Alumina product (example 1) | 27 | 31 | 34 | 40 |
| High-alumina raw material (example 2) | 41 | 44 | 48 | 48 |

As demonstrated by these numbers, the formation of calcium aluminate $12CaO.7Al_2O_3$ was already completed at 1100° C. when the high-alumina raw material according to example 2 was used, while the reaction was still incomplete at 1200° C. with the alumina product according to example 1.

A slag former should have the lowest possible melting point. The melting point of the calcium aluminate based on the high-alumina raw material according to example 2 and sintered at 1100° C. was only 1290° C. (measured according to DIN 51070 as hemisphere temperature by means of a thermal microscope). In contrast a melting point of 1360° C. was reported for the calcium aluminate slag former according to U.S. Pat. No. 6,238,633 sintered at 1093–1193° C.

The superior reactivity observed in the raw material according to example 2 in the production of sintered calcium aluminate leads to the conclusion, that the high-alumina raw material will also have superior sintering properties in other sintered products (such as ceramics and refractories) or fused products (mineral wool, ceramic fibers) in comparison to the alumina product according to example 1 or according to U.S. Pat. No. 6,238,633.

EXAMPLE 4

To produce a porosified building material, an alumina product according to example 1 with 2.4 percent aluminum metal was dried to a moisture content of 4 weight-percent. A quantity of 30 g of the dried alumina product was ground for a time of 10 minutes in a vibratory grinder (laboratory disk grinder). The contents of the grinder were kept at a temperature of 85° C. The new raw material produced in this manner contained aluminum mono-hydroxide (boehmite) and aluminum tri-hydroxide (bayerite) in a weight-ratio of 1.9. The content of metallic aluminum was 1.4 weight-percent.

The new raw material was placed into a plastic beaker of 5 cm diameter and 10 cm height together with alkaline water glass in respective quantities of 30 g and 25 g at room temperature and mixed to a slurry by short stirring (about 1 minute) with a spoon. After about 5 minutes, the slurry began to release a gas, which led to a formation of foam and an increase in volume combined with a heating and hardening of the mixture. The increase in volume (measured by the height of the foamed mixture) and the reaction time were recorded. The resultant increase in volume was about 450 percent, and the hardening into a mechanically stable body occurred after about 10 minutes.

What is claimed is:

1. A high-alumina raw material, comprising in weight-percent, based on dry weight:

| | |
|---|---|
| $Al_2O_3$ | 50–80% |
| MgO | 2–15% |
| $SiO_2$ | 1–15% |
| CaO | 0.5–20% |
| $Fe_2O_3$ | 0.5–2% |
| $Na_2O$ | 0.5–2% |
| Al (metallic) | 0.1–2% |
| AlN | 0.1–1% |
| $K_2O$ | 0.1–1.5% |
| F | 0.1–2% |
| Cl | 0.1–0.8% |
| other components, not to exceed | 5% |
| loss on ignition, not to exceed | 15% | and wherein the mineral form of $Al_2O_3$ comprises, in weight-percent:

| | |
|---|---|
| aluminium hydroxide | 20–60% |
| corundum α-$Al_2O_3$ | 10–40% |
| spinel $MgAl_2O_4$ | 5–40% | wherein the aluminium hydroxide is present as aluminium mono-hydroxide $Al_2O_3.H_2O$ and aluminium tri-hydroxide $Al_2O_3.3H_2O$ with a weight ratio between $Al_2O_3.H_2O$ and $Al_2O_3.3H_2O$ exceeding 0.25.

2. A high-alumina raw material of claim 1, wherein the aluminium mono-hydroxide has the crystallographic form of boehmite.

3. A method of producing the high-alumina raw material of claim 1 from an alumina product, wherein the alumina product is a by-product of a treatment process of aluminum salt slags, the alumina product comprising in weight-percent, based on dry weight

| | |
|---|---|
| $Al_2O_3$ | 50–80% |
| MgO | 2–15% |
| $SiO_2$ | 1–15% |
| Al (metallic) | 1–5% |
| CaO | 0.5–5% |
| $Fe_2O_3$ | 0.5–2% |
| $Na_2O$ | 0.5–2% |
| AlN | 0.1–2% |
| $K_2O$ | 0.1–1.5% |
| F | 0.1–2% |
| Cl | 0.1–0.8% |
| other components, not to exceed | 5% |
| loss on ignition, not to exceed | 15% | and wherein the mineral form of $Al_2O_3$ comprises, in weight-percent:

| | |
|---|---|
| aluminium hydroxide | 20–50% |
| corundum $\alpha$-$Al_2O_3$ | 10–40% |
| spinel $MgAl_2O_4$ | 5–40% | with more than 90 weight-% of the mineral form of $Al_2O_3$ having a particle size of less than 500 μm, said alumina product containing more than 25 weight-% water, wherein the method comprises the steps of: mechanically compacting the alumina product to a bulk density of more than 1.1 g/cm$^3$ (on dried basis), and treating the alumina product under conditions between a moist warm and a hydrothermal state at a temperature of at least 70° C., until the aluminum tri-hydroxide is transformed into aluminium mono-hydroxide and the weight ratio of aluminium mono-hydroxide to aluminium tri-hydroxide exceeds 0.25.

4. The method of claim 3, wherein prior to the mechanical compacting, a quantity of burnt lime is mixed into the alumina product, wherein said quantity does not exceed 20 weight % of a total weight of the mixture, and wherein at least 90 weight-% of said quantity of burnt lime has a particle size smaller 500 μm.

5. The method of claim 3, wherein prior to the mechanical compacting, the alumina product is dried to a residual moisture content of less than 5 weight-%, and wherein the alumina product is mechanically compacted and simultaneously ground up by a vibrational grinder.

6. A method of producing ceramic and refractory materials, cement, porosified binding agent building materials, slag formers for iron and steel, mineral wool and ceramic fibers comprising using the high-alumina raw material of claim 1 as a source of sinter-active alumina.

7. A mixture for manufacturing ceramic and refractory materials, cement, porosified binding agents, slag formers for iron and steel, mineral wool and ceramic fibers, wherein the mixture comprises the high-alumina raw material of claim 1 and at least one of a calcium oxide source an iron oxide source and a silicon oxide source.

8. The mixture of claim 7, wherein the calcium oxide source comprises at least one of lime, limestone, gypsum, anhydrite, dolomite, and cement.

9. The mixture of claim 7, wherein the iron oxide source comprises at least one of burnt iron sulfide, haematite, and red mud.

10. The mixture of claim 7, wherein the silicon oxide source comprises at least one of clay, sand, and fly ash.

* * * * *